(12) United States Patent
Artus (10) Patent No.: US 8,254,570 B2
(45) Date of Patent: Aug. 28, 2012

(54) METHOD AND SYSTEM FOR ENCRYPTION OF DATA

(75) Inventor: Raymonde Gene Clifford Artus, Maharashtra (IN)

(73) Assignee: Karen Mary Artus, Sechelt, British Columbia (CA)

( * ) Notice: Subject to any disclaimer, the term of this patent is extended or adjusted under 35 U.S.C. 154(b) by 275 days.

(21) Appl. No.: 12/670,706

(22) PCT Filed: Jul. 18, 2008

(86) PCT No.: PCT/IN2008/000464
§ 371 (c)(1),
(2), (4) Date: Feb. 10, 2010

(87) PCT Pub. No.: WO2009/066313
PCT Pub. Date: May 28, 2009

(65) Prior Publication Data
US 2010/0153723 A1  Jun. 17, 2010

(30) Foreign Application Priority Data
Jul. 31, 2007 (IN) .......................... 1456/MUM/2007

(51) Int. Cl.
*H04L 29/06* (2006.01)

(52) U.S. Cl. ........................... 380/28; 380/255; 713/168

(58) Field of Classification Search .................. 713/168; 380/28, 255
See application file for complete search history.

(56) References Cited

U.S. PATENT DOCUMENTS

| 6,128,387 A | 10/2000 | Hsieh |
| 6,445,797 B1 * | 9/2002 | McGough ..................... 380/285 |
| 2003/0152219 A1 * | 8/2003 | Coppersmith et al. .......... 380/37 |

FOREIGN PATENT DOCUMENTS

GB  2353191 A  2/2001

OTHER PUBLICATIONS

Rivest, R. "A Description of the RC2(r) Encryption Algorithm", Mar. 1998, RFC 2268, pp. 1-11.*
International Search Report dated Jun. 4, 2009 for PCT/IN08/00464.

* cited by examiner

*Primary Examiner* — Michael Pyzocha
(74) *Attorney, Agent, or Firm* — Burns & Levinson LLP; Janine M. Susan, Esq.

(57) ABSTRACT

A method for transmitting a message securely between two entities, a sender and a receiver remotely located from each other and a system for carrying out the method is disclosed. The method includes using an array containing numbers based on the infinite sequence of value of 'pi'; selecting a pattern and tracing and extracting the selected pattern along the numbers in the array sequentially to form a decimal number string. The decimal string is partitioned and converted to binary which is used as a cipher for coding the message by XORing.

25 Claims, 3 Drawing Sheets

'Pi' series :
3.14159 26535 89793 23846 26433 83279 50288 41971 69399 37510

| 1 | 4 | 1 | 5 | 9 | 2 | 6 |
|---|---|---|---|---|---|---|
| 5 | 3 | 5 | 8 | 9 | 7 | 9 |
| 3 | 2 | 3 | 8 | 4 | 6 | 2 |
| 6 | 4 | 3 | 3 | 8 | 3 | 2 |
| 7 | 9 | 5 | 0 | 2 | 8 | 8 |
| 4 | 1 | 9 | 7 | 1 | 6 | 9 |
| 3 | 9 | 9 | 3 | 7 | 5 | 1 |

● Start point

Decimal Number string traced on the array by the pattern:
9, 9, 4, 6, 3, 8, 2, 1, 7, 3, 7, 0, 3, 3, 3, 8, 8, 5

Partitioned decimal list:
99  463  82  17  370  33  388  5

Decimal number list converted to binary list
1100011  111001111  1010010  10001  101110010  100001  110000100  101

Concatenated Binary string:
110001111100111110100101000110111001010000111 0000100101

Message: WEDIDIT

Message in binary form:
010101110100010101000100010010010100010001 00100101010100

Decoding Key : ( $K_1K_2K_3K_4$ )
Message Packet:
[ 010101110100010101000100010010010100010001 00100101010100 + ( $K_1K_2K_3K_4$ ) ]

Final Message Packet:
[ Encrypted (message+ Key) + Message length ]

Fig. 3

METHOD AND SYSTEM FOR ENCRYPTION OF DATA

CROSS-REFERENCE TO RELATED APPLICATIONS

This application is a U.S. national stage application under 35 U.S.C. 371 of International Application No. PCT/IN08/00464 filed Jul. 18, 2008 and entitled METHOD AND SYSTEM FOR ENCRYPTION OF DATA, which in turn claims priority to Indian Patent Application No. 1456/MUM/2007 filed Jul. 31, 2007.

FIELD OF THE INVENTION

This invention relates to method and system for encryption of data.

Particularly the invention relates to encryption of data to be transmitted remotely.

BACKGROUND OF THE INVENTION

Encryption can be a relatively simple process, or as difficult as the user wants to make it. The degree of difficulty does not necessarily relate to the security of the encryption method. Often there has been a need to protect information from 'prying eyes'. Traditionally, several methods can be used to encrypt data streams, all of which can easily be implemented through software, but not so easily decrypted when either the original or its encrypted data stream are unavailable. (When both source and encrypted data are available, code-breaking becomes much simpler, though it is not necessarily easy). The best encryption methods have little effect on system performance, and may contain other benefits such as data compression built in the system.

PRIOR ART

Encryption devices and systems are well known. Some of the systems and methods currently implemented for encryption purposes are as follows.

US 2003/0115449 A1 describes an encryption method using synchronized continuously calculated pseudo-random key. This invention uses the pseudo-random property of irrational numbers but chooses to use the number sequence in the order generated. It requires special receiving processors working in a strict timing cadence mode between at least two stations for it to work on a token ring network.

U.S. Pat. No. 7,327,845 teaches an apparatus and method establishing a one-time cryptographic pad between a communicating pair, a communicating pair comprising a pair of transmitter-receivers, each of the pair having a plurality of cryptographic devices in common. The communicating pair also store previously exchanged messages and transmissions, a transmission comprising secure data exchanged by the pair that is independent of message content. The first transmitter-receiver randomly selects a cryptographic device and a previous transmission or message that has been sent to the second transmitter-receiver. The first transmitter-receiver also randomly selects a reference to a message or transmission previously sent by the second transmitter-receiver. The first transmitter-receiver encrypts the previously sent transmission or message and the reference to the message or transmission previously sent by the second transmitter-receiver and sends to the second transmitter-receiver. The second transmitter-receiver discovers the encryption device used by the first transmitter-receiver, verifies the message or transmission sent by the first transmitter-receiver, and uses the decrypted reference to access the previously sent transmission or message, then uses the discovered encryption device to encrypt the previously sent transmission or message and sends to the first transmitter-receiver. The first transmitter-receiver decrypts the transmission or message previously sent by the second transmitter-receiver, and authenticates. If authentication is successful, the first transmitter-receiver encrypts using the randomly selected cryptographic device.

U.S. Pat. No. 6,868,495 talks about a content provider to encrypt digital information without requiring either a hardware or platform manufacturer or a content consumer to provide support for the specific form of corresponding decryption. This mechanism can be provided in a manner which allows the digital information to be copied easily for back-up purposes and to be transferred easily for distribution, but which should not permit copying of the digital information in decrypted form. In particular, the encrypted digital information is stored as an executable computer program which includes a decryption program that decrypts the encrypted information to provide the desired digital information, upon successful completion of an authorization procedure by the user.

U.S. Pat. No. 6,445,794 proposes a method for generating an identical electronic one-time pad at a first location and a second location, the method comprising the steps of: (a) providing a first electronic device at the first location and a second electronic device at the second location, each of the first and the second electronic devices having: (i) a non-volatile memory; (ii) a processor; (iii) at least one table of true random numbers being stored on the non-volatile memory, the table being identical for the first and the second electronic devices; and (iv) at least one software program for obtaining a true random number from the table, the software program being stored on the non-volatile memory and the at least one software program being operated by the processor; (b) providing a communication channel for communication between the first electronic device and the second electronic device; (c) selecting a selected true random number from the table at the first and the second electronic devices according to a selection procedure, the selection procedure being identical for the first and the second electronic devices, the selection procedure including exchanging at least a portion of a key between the first and the second electronic devices over the communication channel, such that the selected true random number is identical for the first and the second electronic devices; and (d) forming at least a portion of the identical electronic one-time pad at the first and the second locations with the selected true random number.

However, many encryption systems are prone to attack and in time can be hacked into. Increasing the frequency of key change and using encryption algorithms that make finding out keys for cipher are suggested as possible ways of reducing security threat but obviously they are not foolproof.

Objects of the Invention

The basic reason for the hacking of codes in encryption systems is that a hacker is able to record the encrypted data and then analyze the recorded data to decrypt it.

There is therefore a need for an encryption system and a device therefore, that cannot be subjected to hacking.

This invention envisages a device and a system for encryption of data that is absolute in the sense that the variations for analysis for the purposes of decryption are infinite that it is rendered absolutely free from being hacked.

What therefore is created in accordance with this invention is a system that provides a dynamic code evolved from an ultra fast sequential random number coding scheme that provides absolute encryption.

SUMMARY OF THE INVENTION

In accordance with the invention there is provided a method for transmitting a message securely between two entities, a sender and a receiver, said method comprising the following steps,
    creating plaintext message at the sender;
    converting the plaintext message into binary data;
    forming an array containing numbers based on the infinite sequence of value of 'pi',
    selecting one number in the array as the start point;
    selecting a pattern from a pattern database;
    tracing and extracting the selected pattern along the numbers in the array sequentially and forming a decimal number string;
    partitioning the decimal number string by a partition function to form a decimal number list;
    converting the decimal number list to a binary list;
    concatenating the binary list in a predetermined manner to form a binary string used as a cipher;
    XORing the cipher with the binary data to form an encrypted data packet;
    transmitting the encrypted data packet to the receiver;
    transmitting a decoding key in a secure manner between the sender and the receiver;
    receiving the encrypted data packet at the receiver;
    forming the cipher at the receiver using the decoding key;
    XORing the encrypted data packet with said cipher to obtain the binary data; and
    converting the binary data to plaintext message.

Typically, the method includes the step of sending a pilot file to establish a communication link between the sender and the receiver.

Typically, the method includes the step of securely sending the decoding key to the receiver which includes,
    selecting four random numbers used as position markers for identification of a particular byte in a string;
    sequentially replacing the identified bytes with the four numbers used as Start point, Pattern, Trace and Partition function;
    calculating the average of said four identifier bytes to generate a fifth identifier byte;
    replacing the byte identified by said fifth identifier by a random number to be used as flag point; and
    creating a pilot file consisting of the flag point, start point, pattern, trace and partition function and sending the pilot file to establish a communication link between the sender and the receiver.

Typically, the method includes the step of using a decoding key to decode a predetermined subsequent message.

Typically, the decoding key is generated and attached to the binary data at a pre determined location.

Typically, the step of securely sending the decoding key includes attaching the value of message length to the encrypted data packet at a pre determined location.

Typically, the step of securely sending the decoding key includes extracting the message length from the final data packet from its pre determined location at the receiver end.

Typically, the step of securely sending the decoding key includes separating the message and the decoding key, wherein the decoding key is stored for decoding a subsequent message at the receiver end.

Typically, the step of securely sending the decoding key includes the two entities exchanging one time use decoding keys with each message when data is transmitted between two entities in two way communication.

Typically, the step of securely sending the decoding key comprises forming a pilot file containing the decoding key and sending said pilot file to the receiver before transmitting the encoded data.

Typically, the step of securely sending the decoding key comprises providing a password; combining the password with a system identifier and hashing it to produce a unique address for sending the message.

Typically, the step of tracing the pattern includes identifying a set of cells about the start point and sequentially reading the contents of each cell and placing said number in a register to form a decimal number string.

Typically, the step of tracing of the pattern is carried out in clockwise, anti clockwise or any other defined manner.

Typically, the step for partitioning includes creating segments of predetermined lengths from the decimal number string to form a decimal number list.

Typically, the method includes the step of storing of said decoding key in a temporary file at the receiver.

Typically, the method includes replacing of a stored decoding key at the receiver with a decoding key received along with an incoming message.

Typically, the method includes forming a cipher of length equal to or greater than the length of message to be coded.

In accordance with this invention there is provided a system for transmitting a message securely between two entities, a sender and a receiver, said system comprising,
    means to create plaintext message at the sender;
    means for converting the plaintext message into binary data;
    means to form an array containing numbers based on the infinite sequence of value of 'pi';
    selection means to select one number in the array as the start point;
    pattern selection means adapted to select a pattern from a pattern database;
    tracing means adapted to the selected pattern along the numbers in the array sequentially and extracting means to extract said numbers to form a decimal number string;
    partitioning means to partition the decimal number string by a partition function to form a decimal number list;
    means to convert the decimal number list to a binary list;
    means for concatenating the binary list in a predetermined manner to form a binary string to be used as a cipher;
    first XORing means for XORing the cipher with the binary data to form an encrypted data packet;
    transmission means to transmit the encrypted data packet to the receiver;
    secure transmission means to transmit a decoding key between the sender and the receiver;
    receiver means to receive the encrypted data packet;
    message extracting means to extract message including a cipher forming means at the receiver for forming the cipher using a decoding key; a second XORing means at the receiver for XORing the encrypted data packet with said cipher to obtain the binary data; and means for converting the binary data to the plaintext message.

Typically, the system is adapted to send a pilot file to establish a communication link between the sender and the receiver.

Typically, the system includes a key forming means for forming the decoding key.

Typically, the system includes an attaching means to attach the decoding key to a message to be transmitted.

Typically, the system is also provided with means for attaching the message length value to the encrypted data packet at predetermined location.

Typically, the receiver includes means to retrieve the message length from the final message packet from its predetermined location.

Typically, the system includes at least two arithmetic logic units for implementing the various operations.

Typically, the system includes at least one arithmetic logic unit at sender end and one at receiver end.

DETAILED DESCRIPTION

This invention relates to devices and systems for encryption of data to be transmitted between persons remotely located relative to each other.

Encryption devices and systems are well known.

However, many encryption systems are prone to attack and in time can be hacked into. Increasing the frequency of key change and using encryption algorithms that make finding out keys for cipher are suggested as possible ways of reducing security threat but obviously they are not foolproof.

The basic reason for the hacking of codes in encryption systems is that a hacker is able to record the encrypted data and then analyze the recorded data to decrypt it.

There is therefore a need for an encryption system and a device therefore, that cannot be subjected to hacking.

This invention envisages a device and a system for encryption of data that is absolute in the sense that the variations for analysis for the purposes of decryption are infinite that it is rendered absolutely free from being hacked.

What therefore is created in accordance with this invention is a system that provides a dynamic code evolved from an ultra fast sequential random number coding scheme that provides absolute encryption.

Typically in accordance with the device and system of this invention a unique random sequence of numbers, of infinite length, are adapted to be generated simultaneously and identically between a sender and a recipient.

This simultaneous random number sequence generation, is used by the system to encode and decode data by parties involved in the data interchange The probability of decoding the encoded data and therefore illegitimate and unauthorized decryption by an outside party is zero as the data is encoded using the equivalent of an infinite size 'one time pad' envisaged in accordance with this invention.

It is believed by the inventor that a 'one time pad'-encoding system, with a pad larger than the message sent, is theoretically undecipherable.

It is further envisioned in accordance with this invention that the unique random number sequence generated in the system of this invention will be XORed on the plain text data stream constituting the data to be transmitted at the sender end which will be reversed at the recipient end in accordance with a predetermined set of rules and conditions. By this means the transfer of confidential information is achieved at a rate dependent only on the speed of a simple XOR unit.

Figure 1:
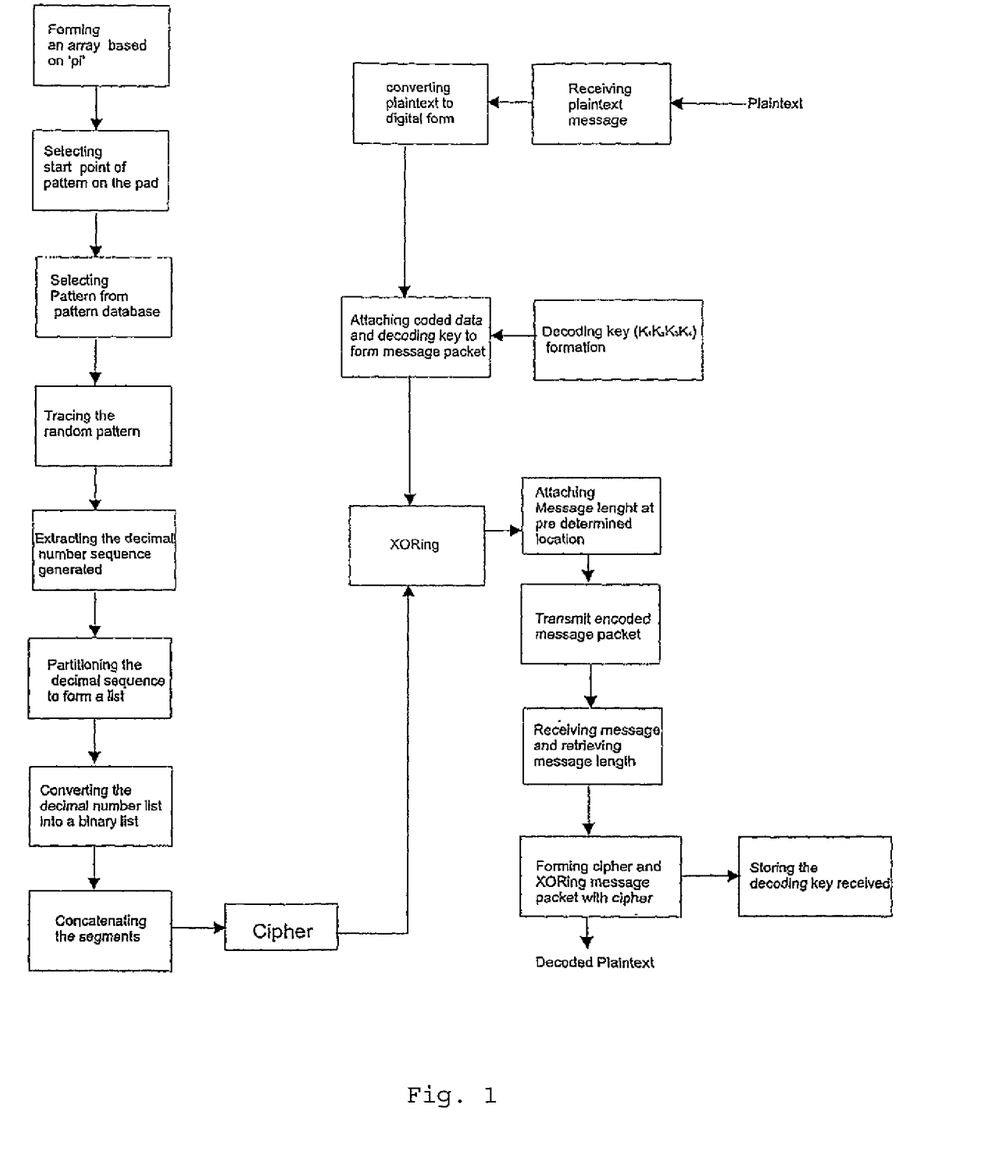
FIG. 1 of the accompanying drawings illustrates a flowchart describing the method for encryption and decryption in accordance with this invention.

FIG. 1 shows a flow diagram illustrating the steps in accordance with one embodiment of the invention. The method of encryption and decryption comprises the following steps, creating plaintext message at the sender;
converting the plaintext message into binary data;
forming an array containing numbers based on the infinite sequence of value of 'pi';
selecting one number in the array as the start point;
selecting a pattern from a pattern database;
tracing and extracting the selected pattern along the numbers in the array sequentially and forming a decimal number string;
partitioning the decimal number string by a partition function to form a decimal number list;
converting the decimal number list to a binary list;
concatenating the binary list in a predetermined manner to form a binary string used as a cipher;
XORing the cipher with the binary data to form an encrypted data packet;
transmitting the encrypted data packet to the receiver;
transmitting a decoding key by secure means between the sender and the receiver;
receiving the encrypted data packet at the receiver;
forming the cipher at the receiver using the decoding key;
XORing the encrypted data packet with said cipher to obtain the binary data; and
converting the binary data to plaintext message.

Typically, the method includes sending a pilot file to establish a communication link between the transmitter and the receiver. The decoding key is used to decode a predetermined subsequent message.

In accordance with one embodiment of the invention, a decoding key is generated and then attached to the message at a pre determined location. The system also includes means for attaching the value of message length to the encrypted message packet at a pre determined location known to the receiver forming the final message packet. at the receiver the message length is separated from the encrypted message packet. The decoding key is separated from the message and stored at the receiver to decode a subsequent message.

In accordance with another embodiment if the communication is two way and the transmitter and receiver exchange keys with each message that is sent.

In yet another embodiment of the invention the decoding key is sent by the transmitter in form of a pilot message before each message is sent to the receiver.

Before coding the message, the length of the message is obtained. The partition function only indicates the way partitioning of the decimal number string is carried out. In order to form a cipher which is of comparable length of the message, the decimal number string is partitioned iteratively till the number of items in the partitioned list is equal to or greater than the number of items in the message to be encoded. The value of the length of the message is attached to the encrypted message before transmitting. The decoding key is used to decode a predetermined subsequent message. The method includes sending a pilot file to establish a communication link between the transmitter and the receiver. The transmitter and the receiver provide a password that is combined with a system identifier and hashed to produce a unique address. The transmitter also provides with four numbers that are used as the start point, the identification numbers for pattern, trace and the partition functions to form said pilot file. The method is implemented by an arithmetic logic unit. Typically, the arithmetic logic unit selects four random numbers used as position markers for identification of a particular byte in a string. The average of said four identifier bytes is calculated to generate a fifth identifier byte. The method includes replacing the byte identified by said fifth identifier by a random number to be used as flag point. An address file is created consisting of the flag point, start point, pattern, trace and partition function is formed by said Arithmetic logic unit. The one time pad is formed on receiving a request to send a coded message to said unique address. The pattern identifies a set of cells about the start point and the tracing function sequentially reads the contents of each cell and places said number in a register forming a number string. The partition function creates segments of predetermined lengths from the number string forming a number list. The tracing of the pattern may be carried out in clockwise, anti clockwise or any other defined manner.

The decoding key is stored in a temporary file at the receiver. The received message is decoded with the decoding key. The existing decoding key in an address file database is replaced with the decoding key received along with the message at that instant.

Figure 2:
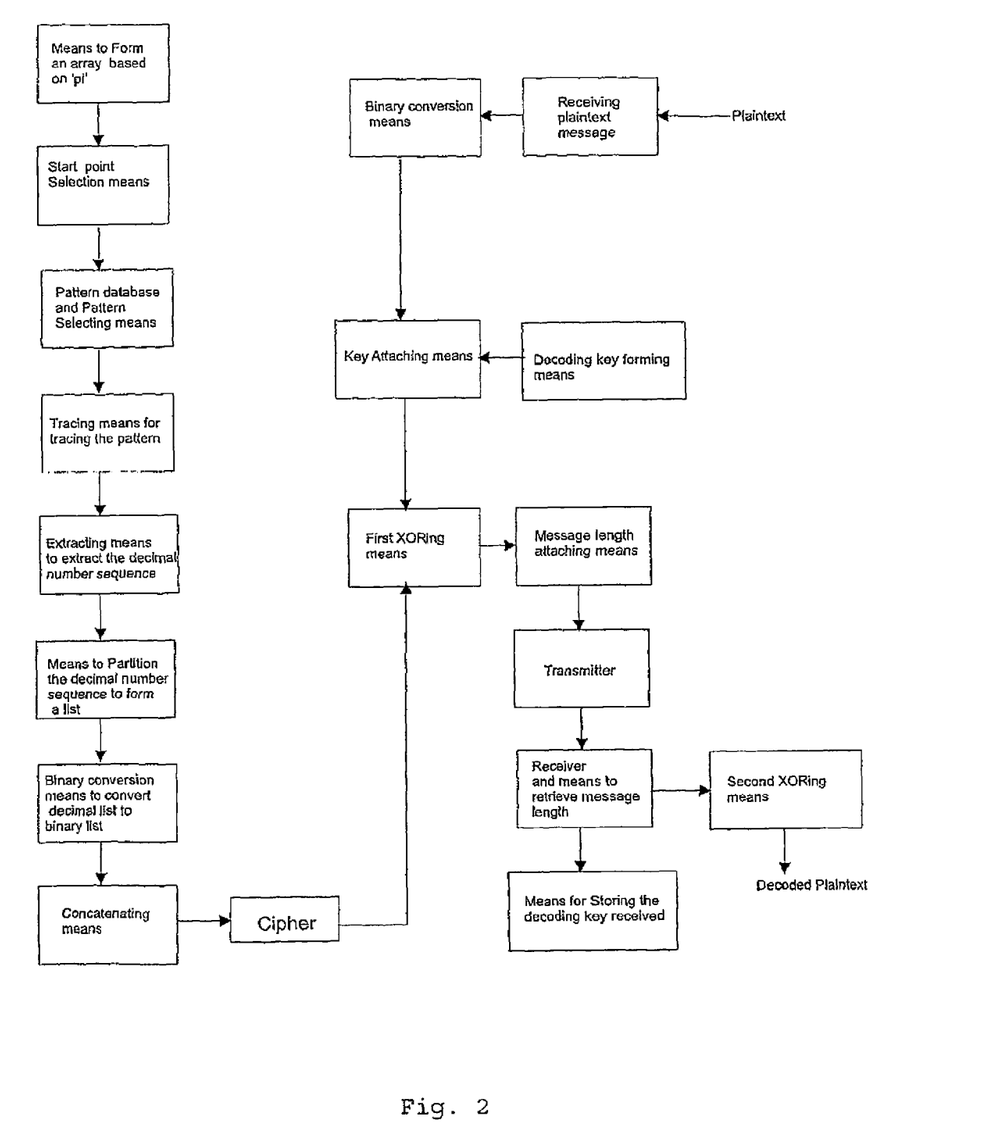
FIG. 2 of the accompanying drawings illustrates a block diagram of a system for encryption and decryption in accordance with this invention.

FIG. 2 of the accompanying drawings illustrates a block diagram of a system in accordance with one embodiment of the invention for encryption and decryption in accordance with this invention.

In accordance with this invention there is provided a system for encryption of data, said system comprises means to receive a plaintext data and to convert the plaintext data into digital format. The system is also provided with means to form an array based on the infinite sequence of value of 'pi'. A selection means to select one item in the array as the start point is provided. A pattern database stores a variety of random and geometric patterns. A pattern selection means is included which is adapted to select a pattern from the pattern database. Tracing means are included for tracing the selected pattern along the items of the array. An extracting means extract the numbers identified by tracing the pattern sequentially to form a decimal number string. The decimal number string is then partitioned by partitioning means and a decimal number list is formed. Binary conversion means convert the decimal number list into a binary list. The binary list is then concatenated or combined together using means for concatenating. The binary string thus obtained is used as the cipher for encryption. A key generating means to generate a decoding key which is attached to the binary message by attaching means to form the message packet. the decoding key comprises indicates the pattern, start point, a partition function, and the trace function. A first XORing means XOR the cipher with the message packet to form encrypted message packet. The value of the message length is attached to the encrypted message at a predetermined location which is known to the receiver forming the final message packet that is transmitted to the receiver. The transmitter means transmits this final message packet to the receiver.

After receiving the final message packet from the transmitter, the message length is retrieved from its pre determined location. The message length is used to form an identical cipher by using it along with a decoding key which is stored previously at the receiver. After forming the cipher, the encrypted message packet is XORed with it. This results in obtaining the message packet. The message and the decoding key attached to it are separated by using a decoding key previously transmitted to the receiver and stored in the receiver. Thus the plaintext message is obtained. The decoding key separated from the message is stored for decoding a subsequent message.

Following parameters are required for implementation of the method for encryption in accordance with this invention.

Main Array: an array of single digit numbers that are randomly distributed within the array.

The Pattern Function F (Pttn):—defines a specific arrangement of cells that are to be addressed in the main array.

The Start Point: Nstp, this locates F (Pttn) at a particular point in the Main Array.

The Trace Function F (Trc):—defines a particular sequence to read the cell content of those cells in the Main Array addressed by F (Pttn).

The Partition Function F (Prt):—segments the decimal data stream obtained from F (Trc) into a unique set of decimal numbers.

The Pilot File:—this is the first file to be sent to establish secure communication between two entities.

The Flag Point:—this identifies the place in the cipher message stream that contains the new code set [F (Pttn), F (Trc), F (Prt), Flag Point] that is to be used for a secure reply.

Figure 3:
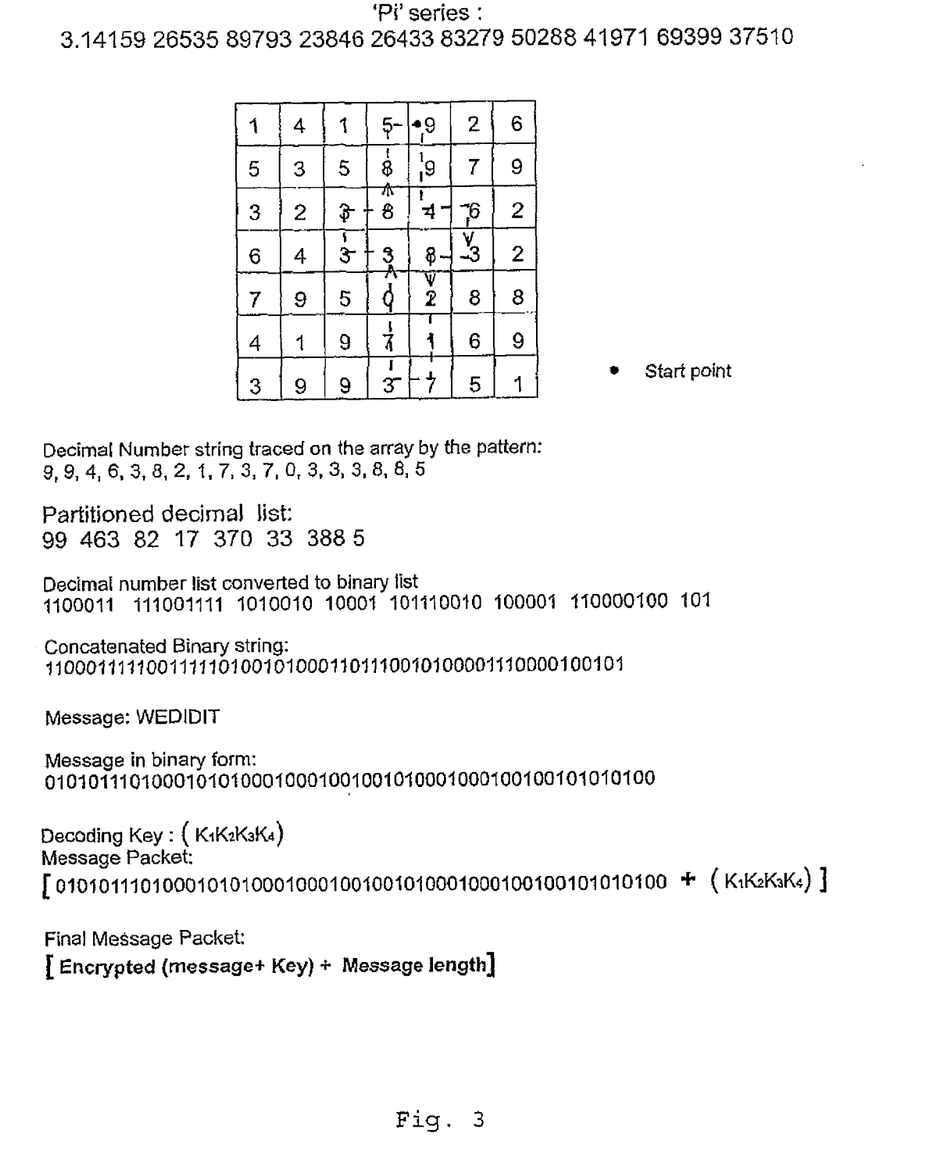
FIG. 3 of accompanying drawings illustrates the formation of a one time cipher in accordance with this invention.

FIG. 3 illustrates the one embodiment of this invention illustrating method for forming the one time cipher. The pad is assembled on receiving a request to send an encrypted message to a particular address.

The address field of the recipient contains the code set that the recipient will use to decrypt the message sent. An ALU will start the process of 'pad assembly' by first retrieving from the address field the start point number Nstp that will locate a pattern in the Main Array, then the pattern number Pttn and the trace sequence Trc. Pttn identifies a set of cells about the point Nstp and Trc will sequentially read the contents of each cell so identified and place that decimal number into a FIFO register. The FIFO register now contains a string of decimal numbers. The ALU will now retrieve Prt from the address file and will then segment this FIFO decimal string into a number sequence where Prt gives the length of each number; this number list is stored in a file. The ALU will then sequentially take each number from this file and convert the decimal number to binary form. These binary numbers are then concatenated into a continuous binary string and stored in the Binary String store thus forming the One Time Pad or cipher.

All the data in a PC is in the form of 'zeros & ones', but these are in essence coded, and not pure 'binary'. Hence, numbers may held to any base and would be mathematically/logically treated as such by the ALU, they are represented as a 'zero & one strings' with a machine code that defines the base. Thus it is required to change the base from 10 to 2.

The method for using the cipher for encryption of data can be explained in detail as follows.

The Pilot File is the means to initiate secure communication between two entities. Each entity, on installation of the encryption system, will be asked to provide a password that is then combined with a system identifier and hashed to produce a number. This number will be used in all secure system communications to provide a unique identifying address.

On installation the entity will also be asked for four numbers, these will be the 'seed' install of the code set. Thus the numbers will be the initial NStp, NPttn, NTrc & NPrt used to assemble the first Pilot File. To assemble the Pilot File, the ALU will load 1 Kbyte of random numbers into a string file. The ALU will then select four more random numbers, in the range 1 to 1 k; each random number is taken as a position marker that identifies a particular byte in the string file. The ALU will then replace each identified byte in the string file with a seed code number. The ALU will then determine the average of the 'identifier' bytes, $[N_1+N_2+N_3+N_4]/4$ to generate a fifth identifier and will replace that byte with a random number in the range 1 to 1 K, which will be the seed Flag Point. The assembled Pilot String is now 1 Kbyte long with a code set and Flag Point randomly distributed along its length. The four 'byte identifier' numbers are held in a Send SMS file. The Pilot File is now complete; the file is automatically remade and the SMS file updated at the end of any message file sent. The Pilot File will be recognized as such by any # entity, due to the presence of the # number and standard file length. Therefore, to initiate secure communication between two entities #A & #B, the Pilot File is used in the following manner. # A.com wishes to set up secure communications with # B.com. #A writes a short note to B at the #B.URL; as #A does not have a logged in address file and code set for #B the program enters the 'Set up' routine. The ALU sets up the address file for #B, which consists of, the #B.URL plus five fields that are:—[Flag point], [NStp], [NPttn], [NTrc] & [NPrt]. The ALU will then retrieve the Pilot File, copy the code set in the file into the relevant address fields and add the Pilot File to A's short note. The ALU makes the SMS file available for A to read, so that A can send to B a TEXT, SMS, or by other means, a message with the numbers of those four bytes in the Pilot File that have code data. #A can now receive and decrypt from #B a message encrypted with the code set currently in A's #B address file. #A will also expect to receive a new code set to reply to #B, and that this set will be located at [Flag point] in the incoming message. The #B ALU will recognize that B's system does not have a logged-in address file for #A, and will look for and store the Pilot File in an #A pending file. On receiving the four numbers, B will call the #A pending file and input these numbers so that the ALU can extract the code set and Flag point and set up the #A address file. #B is now in a position to send a coded message to #A with the code currently in the #A address field and will insert at the #A Flag point another code set and Flag point for #A to reply. Thus by this manner the code set [Pad] is automatically and randomly changed for each message sent.

The Infinite "One Time Pad" or Vernam style byte Sequence Generator Consider an array of cells $n_1 \times n_2$ and where $n_1 \times n_2$ is $\geq 1000$.

Let each cell contain one number, in the range 0-9, and let the numbers be placed to form an array of the number set $N=n_1 \times n_2$.

Any set of random numbers could, in principle, be used. The preferred number set is taken from the digits of Π as this transcendental and irrational number has been extensively studied up to $10^{12}$ digits and no pattern has yet been found to exist in this sequence.

From a known starting point, a path is drawn on the array of cells in a known particular geometric pattern F (Pttn). It is now possible to extract, via this known pattern, a particular number set from a large number of possible sets. The geometric pattern element in this scheme has three logical parts; the elemental pattern, it's replication across the array and the tracing direction on this pattern. These three parameters and the starting point will define a particular number sequence.

The elemental geometric pattern used is adapted to cover a sufficient number of cells to represent a 'fair sample' of the original set N, that is to say, it should contain at least $\sqrt{N}$ cells, where N is the number of cells in the array: let $\sqrt{N}=M$.

This sample is effectively a Combination of M objects from N

This 'elemental' pattern set may then be replicated across the array without overlapping; each replication thus represents an independent sample of the original data set; a change in the geometry of the pattern results in a new set of independent samples.

This sample set M may then be arranged in M! ways; a particular number sequence M* will be obtained, defined, by the tracing direction across the elemental pattern, given by F(Trc)

The defined number sequence M* is then partitioned into numbers, each an (n) digit number according to some agreed partition. This partition function F (Prt) is such, that the total number of digits encompassed by F (Prt)=M*+1; the number sequence M* may then be cycled through the pattern function $F(P_t)$, M*−1 times before the (n) digit number sequence is repeated.

By changing M (moving to a new 'elemental' pattern), or by selecting a new M* (changing the direction of the pattern trace), or by choosing a new F (Prt) function, a new independent (n) digit number sequence may be obtained.

Thus in accordance with this invention it is possible to generate an infinite number of (n) digit numbers.

By taking each of the (n) digit numbers in the decimal list sequence, translating them to binary numbers and concatenating the result, a continuous binary stream is obtained.

If the original data set N is random then each of the 'fair samples' is also random therefore the resulting number sequence is also a random sequence. The randomness of any set M can be defined as having zero patterns and where all digits appear with the same statistical frequency. As yet no patterns have been found in the digits of π and these characteristics would be reflected in each 'fair sample'.

The system is further adapted to permit, sequentially, taking one or n bytes at a time of the binary stream and 'XOR'ing with the data stream, to attain absolute encryption of the plain text. The resulting cipher text sequence, composed of a modified unique random number is decipherable only to recipients who are in possession of the relevant pattern profiles needed to regenerate the number sequence. This number sequence is the same length as the plain text and results in a cipher text that is no more than approximately 5 bytes longer than the original plain text.

The relevant pattern profile and other key parameters such as the partition sequence and location of the starting point on the 'one time pad' can be transmitted between sender and recipient and is preferably adapted to be derived randomly and stored by embedding it in a selectively retrieval manner in a previously sent message or a sequence of messages.

This particular cipher method is particularly useful in order to move large amounts of confidential data typically between banks at the greatest possible speed and minimum amount of risk.

The logic required to implement this system is readily achievable with a hardwired system and is envisaged to provide very fast encryption, being dependent only on the speed of the XOR unit in the system.

A feature of the system is that a relatively small number of cells are required to implement a 256-digit encryption.

Consider an array N of 1024 cells.

Let the elemental pattern M be 256 cells, then the number of possible arrangement would be the combination $(M_N)$= 2.97E+755.

This sample M may then be arranged in M! ways, =8.58E+ 506; the tracing direction selects one of these options to give the number string of M*

When this is partitioned into 3/4/or 5 digit segments to obtain a sequence M* of numbers, the digits of M* are cycled by F (Prt) to generate a string of 4096 non-repeating numbers, each digital number of this sequence will, on average, convert to a binary number covering approximately 1.8 bytes.

Thus each M* and F (Prt) generates a concatenated binary string of approximately 7.4 Kbytes; there are 16 simple trace directions for the elemental pattern, each provides a new M*, and if it is assumed that F (Prt) has also 8 variants, then it is possible to generate approximately 943 Kbyte at each station on the elemental pattern sequence.

This process has generated a unique byte sequence, where each byte may then be XORed with the plain text to generate the cipher text If the XOR function is performed over 2 bytes or a word at a time, and if there is an odd number of bytes in the byte sequence, then that file sequence may logically be cycled without repetition B-1 times, where B=number of bytes in the sequence.

Thus in this example, a plain text file of 82×10^10 bytes may be encoded before a new M is required.

In another embodiment of the invention the code may be used in a different manner to that laid out in the 'straight encryption' process, in that it is possible to use the system to "verify" a printed item. In this mode, a printed pattern is used to relate two printed numbers that are with the pattern; only by knowing the relevant code can these printed numbers be reconciled with the pattern. This would prevent cloning of credit cards and would remove the need for a magnetic strip.

EXAMPLE

Message: WEDIDIT
Message in binary form:
01010111010001010100010001001001010001000
100100101010100
Decimal Number string traced on the array by the pattern:
9, 9, 4, 6, 3, 8, 2, 1, 7, 3, 7, 0, 3, 3, 3, 8, 8, 5
Partitioned decimal number string to form decimal number list:
99 463 82 17 370 33 388 5
Partitioning of the decimal number string may be repeated to obtain a longer list so that the cipher formed is of length greater than or equal to that of the message.

If the string '99 463 82 17 370 33 388 5' is not sufficient to decode the message, then another iteration of partitioning is carried out.

For eg: next iteration will produce a list with numbers '9 94 638 21 73 03 338 85'. This iteration is carried out till the length of the list is sufficient for encoding the message.

Decimal number list converted to binary list
1100011 111001111 1010010 10001 101110010 100001 110000100 101
Concatenated Binary string:
11000111110011111010010100011011100101000011110000100101
A decoding key, $(K_1K_2K_3K_4)$ is then formed comprising the start point; pattern, tracing function, and partition function for decoding a message. This key is attached to the binary message to form the message packet.

Message packet:
[01010111010001010100010001001001010001000100100101010100+$(K_1K_2K_3K_4)$]
The message packet as formed above is further XORed with the cipher to obtain encrypted message packet. This encrypted message packet is further attached with the length of the message at a pre determined location known to the receiver thus forming the final message packet.

Final Message Packet:
[Encrypted (message+Key)+Message length at predetermined location]
This final message packet is then transmitted to the receiver end.

At the receiver the message length is retrieved and separated from the final message packet. The receiver forms an identical cipher as one used for encoding using the message length and the decoding key stored with it. In order to form a cipher which is of comparable length of the message, the decimal number string is partitioned iteratively till the number of items in the partitioned list is equal to or greater than the number of items in the message to be decoded. At the receiver end the encrypted message is XORed with the cipher generated and the message packet is obtained. The decoding key previously stored at the receiver is used to decode the message. The decoding key stored by the receiver for decoding the current message is replaced by the next decoding key received with the incoming message. This next decoding key is used for decoding a subsequent message.

While considerable emphasis has been placed herein on the specific structure of the preferred embodiment, it will be appreciated that many alterations can be made and that many modifications can be made in the preferred embodiment without departing from the principles of the invention. These and other changes in the preferred embodiment as well as other embodiments of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A method for transmitting a message securely between two entities, a sender and a receiver, said method comprising the following steps,
   creating plaintext message at the sender;
   converting the plaintext message into binary data;
   forming an array containing numbers based on the infinite sequence of value of 'pi';
   selecting one number in the array as the start point;
   selecting a pattern from a pattern database;
   tracing and extracting the selected pattern along the numbers in the array sequentially and forming a decimal number string;
   partitioning the decimal number string by a partition function to form a decimal number list;
   converting the decimal number list to a binary list;
   concatenating the binary list in a predetermined manner to form a binary string used as a cipher;
   XORing the cipher with the binary data to form an encrypted data packet;
   transmitting the encrypted data packet to the receiver;
   transmitting a decoding key in a secure manner between the sender and the receiver;
   receiving the encrypted data packet at the receiver;
   forming the cipher at the receiver using the decoding key;
   XORing the encrypted data packet with said cipher to obtain the binary data; and
   converting the binary data to plaintext message.

2. The method as claimed in claim 1 wherein the method includes the step of sending a pilot file to establish a communication link between the sender and the receiver.

3. The method as claimed in claim 1 which includes the step of securely sending the decoding key to the receiver which includes,
   selecting four random numbers used as position markers for identification of a particular byte in a string;

sequentially replacing the identified bytes with the four numbers used as Start point, Pattern, Trace and Partition function;

calculating the average of said four identifier bytes to generate a fifth identifier byte;

replacing the byte identified by said fifth identifier by a random number to be used as flag point; and creating a pilot file consisting of the flag point, start point, pattern, trace and partition function and sending the pilot file to establish a communication link between the sender and the receiver.

4. The method as claimed in claim 1 wherein said decoding key is used to decode a predetermined subsequent message.

5. The method as claimed in claim 1 wherein the decoding key is generated and attached to the binary data at a pre determined location.

6. The method as claimed in claim 5 which includes the step of securely sending the decoding key includes attaching the value of message length to the encrypted data packet at a pre determined location.

7. The method as claimed in claim 5 wherein the step of securely sending the decoding key includes extracting the message length from the final data packet from its pre determined location at the receiver end.

8. The method as claimed in claim 5 wherein the step of securely sending the decoding key includes separating the message and the decoding key, wherein the decoding key is stored for decoding a subsequent message at the receiver end.

9. The method as claimed in claim 1 wherein step of securely sending the decoding key includes the two entities exchanging one time use decoding keys with each message when data is transmitted between two entities in two way communication.

10. The method as claimed in claim 1 wherein step of securely sending the decoding key comprises forming a pilot file containing the decoding key and sending said pilot file to the receiver before transmitting the encoded data.

11. The method as claimed in claim 1 wherein the step of securely sending the decoding key comprises providing a password; combining the password with a system identifier and hashing it to produce a unique address for sending the message.

12. The method as claimed in claim 1 wherein the step of tracing the pattern includes identifying a set of cells about the start point and sequentially reading the contents of each cell and placing said number in a register to form a decimal number string.

13. The method as claimed in claim 1 wherein the step of tracing of the pattern is carried out in clockwise, anti clockwise or any other defined manner.

14. The method as claimed in claim 1 wherein the step for partitioning includes creating segments of predetermined lengths from the decimal number string to form a decimal number list.

15. The method as claimed in claim 1 wherein the method includes the step of storing of said decoding key in a temporary file at the receiver.

16. The method as claimed in claim 1 wherein the method includes replacing of a stored decoding key at the receiver with a decoding key received along with an incoming message.

17. The method as claimed in claim 1 wherein the method includes forming a cipher of length equal to or greater than the length of message to be coded.

18. A system for transmitting a message securely between two entities, a sender and a receiver, said system comprising, means to create plaintext message at the sender;

means for converting the plaintext message into binary data;

means to form an array containing numbers based on the infinite sequence of value of 'pi';

selection means to select one number in the array as the start point;

pattern selection means adapted to select a pattern from a pattern database;

tracing means adapted to the selected pattern along the numbers in the array sequentially and extracting means to extract said numbers to form a decimal number string;

partitioning means to partition the decimal number string by a partition function to form a decimal number list;

means to convert the decimal number list to a binary list;

means for concatenating the binary list in a predetermined manner to form a binary string to be used as a cipher;

first XORing means for XORing the cipher with the binary data to form an encrypted data packet;

transmission means to transmit the encrypted data packet to the receiver;

secure transmission means to transmit a decoding key between the sender and the receiver;

receiver means to receive the encrypted data packet;

message extracting means to extract a message including a cipher forming means at the receiver for forming the cipher using a decoding key; a second XORing means at the receiver for XORing the encrypted data packet with said cipher to obtain the binary data; and means for converting the binary data to the plaintext message.

19. The system as claimed in claim 18 wherein said system is adapted to send a pilot file to establish a communication link between the sender and the receiver.

20. The system as claimed in claim 18 wherein the system includes a key forming means for forming the decoding key.

21. The system as claimed in claim 18 wherein the system includes an attaching means to attach the decoding key to a message to be transmitted.

22. The system as claimed in claim 18 wherein system is also provided with means for attaching the message length value to the encrypted data packet at predetermined location.

23. The system as claimed in claim 18 wherein the receiver includes means to retrieve the message length from the final message packet from its predetermined location.

24. The system as claimed in claim 18 wherein the system includes at least two arithmetic logic units for implementing the various operations.

25. The system as claimed in claim 18 wherein the system includes at least one arithmetic logic unit at sender end and one at receiver end.

* * * * *